United States Patent Office 3,359,305
Patented Dec. 19, 1967

3,359,305
PREPARATION OF SULFO ESTERS OF
α-METHYLENE CARBOXYLIC ACIDS
David P. Sheetz, Midland, Mich., assignor to The Dow Chemical Company, Midland, Mich., a corporation of Delaware
No Drawing. Filed Dec. 16, 1963, Ser. No. 330,585
5 Claims. (Cl. 260—486)

This invention pertains to an improved method for the preparation of sulfo esters of α-methylene carboxylic acids with aliphatic hydroxy sulfonic acids.

In U.S. Letters Patent 3,024,221 there are described sulfo esters of α-methylene carboxylic acids, i.e., esters of α-methylene carboxylic acids and hydroxy sulfonic acids, such as 2-sulfoethyl acrylate and 2-sulfoethyl methacrylate. The above-identified patent discloses that such esters can be made by the interaction of α-methylene carboxylic acyl halides such as acryloyl chloride and hydroxy sulfonic acid salts such as sodium isethionate.

In instances where the hydroxy sulfonic acid is an aliphatic hydroxy sulfonic acid, the reaction thereof with an acyl halide such as acryloyl chloride results in the formation of a hydrogen halide such as hydrogen chloride. In most such instances, a part of the hydrogen halide so formed reacts with the unsaturated linkage in the α-methylene carboxylic acid acyl halide or ester product, thereby forming a β-halocarboxylic acid derivative as a by-product and diminishing the yield of the α-methylene carboxylic acid ester product. U.S. Letters Patent 2,923,-734 describes an improved method for preparing sulfo esters of α-methylene carboxylic acids comprising heating at a temperature of from 50° C. to 200° C. a mixture of an α-methylene carboxylic acid and an aliphatic hydroxy sulfonic acid, usually in approximately stoichiometric proportions. The products of the reaction are isolated by removing volatile contaminants by ordinary distillation or preferably are isolated and purified by first forming the sulfonic acid salt, then recrystallizing such salt; e.g., recrystallizing such salt from a methanol-water mixture. However, sulfo esters of α-methylene carboxylic acids of even greater purity than provided by the above described methods and especially improved yields of products are desired.

It is an object of this invention to provide an improved method for preparing sulfo esters of α-methylene carboxylic acids. A more specific object is to prepare esters of α-methylene carboxylic acids and aliphatic hydroxy sulfonic acids in higher yields and of greater purity.

These and other objects and advantages of the invention will be evident in the following description.

The objects of this invention have been attained in a method of direct esterification wherein an aliphatic hydroxy sulfonic acid and an α-methylene carboxylic acid in the free-acid form are reacted by the steps comprising:

(a) Forming a mixture of an α-methylene carboxylic acid, an aliphatic hydroxy sulfonic acid and an effective amount of a polymerization inhibitor in which mixture the α-methylene carboxylic acid is present in a quantity of from about 3 to about 10 times the quantity of the sulfonic acid, calculated on a mole basis;

(b) Heating the mixture at a pressure of from about 20 mm. of mercury to about 200 mm. of mercury while azeotropically distilling α-methylene carboxylic acid and water, and (c) Removing residual α-methylene carboxylic acid by distilling at a pressure less than 30 mm. of mercury.

The α-methylene carboxylic acids useful in the practice of this invention have the formula

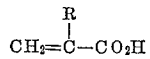

wherein R represents hydrogen, a halogen such as chlorine, or an organic radical such as an alkyl radical especially alkyl radicals having up to 8 carbon atoms.

Specific exmples of α-methylene carboxylic acids which are suitable starting materials are acrylic acid, methacrylic acid, α-ethylacrylic acid, α-propylacrylic acid, α-butylacrylic acid, α-pentylacrylic acid, α-hexylacrylic acid, α-cyclohexylacrylic acid, and α-chloroacrylic acid.

The aliphatic hydroxy sulfonic acids which are used with the α-methylene carboxylic acids to produce the products of this invention are those having the formula

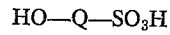

wherein Q represents a bivalent organic radical in which the —OH radical is attached to an aliphatic carbon atom, such as the hydroxyalkanesulfonic acids.

Specific examples of such aliphatic hydroxy surfonic acids that are suitable starting materials are 2-hydroxyethanesulfonic acid (isethionic acid), 2 - hydroxy - 1 - propanesulfonic acid, 1 - hydroxy - 2 - propanesulfonic acid, 2 - hydroxy - 1 - butanesulfonic acid, 1 - hydroxy - 2 - butanesulfonic acid, 3 - hydroxy - 2 - butanesulfonic acid, 1 - hydroxy - 2 - methyl - 2 - propanesulfonic acid, 2 - hydroxy - 2 - methyl - 1 - propanesulfonic acid, 3 - bromo - 1 - hydroxy - 2 - propanesulfonic acid, 3 - bromo - 2 - hydroxy - 1 - propanesulfonic acid, 3 - chloro - 1 - hydroxy - 2 - propanesulfonic acid, 3 - chloro - 2 - hydroxy - 1 - propanesulfonic acid, 1 - bromo - 2 - hydroxy - 3 - butanesulfonic acid, 1 - bromo - 3 - hydroxy - 2 - butanesulfonic acid, 1 - chloro - 2 - hydroxy - 3 - butanesulfonic acid, 1 - chloro - 3 - hydroxy - 2 - butanesulfonic acid, 3 - bromo - 1 - hydroxy - 2 - butanesulfonic acid, 3 - bromo - 2 - hydroxy - 1 - butanesulfonic acid, 3 - chloro - 1 - hydroxy - 2 - butanesulfonic acid, 3 - chloro - 2 - hydroxy - 1 - butanesulfonic acid, 1 - chloro - 2 - hydroxy - 2 - methyl - 3 - propanesulfonic acid, 1 - chloro - 3 - hydroxy - 2 - propanesulfonic acid, 1 - chloro - 2 - (chloromethyl) - 2 - hydroxy - 3 - propanesulfonic acid, 1 - chloro - 2 - (chloromethyl) - 3 - hydroxy - 2 - propanesulfonic acid, 1 - hydroxy - 3 - methoxy - 2 - propanesulfonic acid, 2 - hydroxy - 3 - methoxy - 1 - propanesulfonic acid, 2 - hydroxycyclohexanesulfonic acid, 2-hydroxy - 2 - phenylethanesulfonic acid, 2 - hydroxy - 1 - phenylethanesulfonic acid, 2 - bromo - 3 - hydroxy - 2 - methyl - 3 - phenyl - 1 - propanesulfonic acid, 3 - hydroxy - 1 - propanesulfonic acid, 3 - hydroxy - 1 - butanesulfonic acid, 1 - hydroxy - 1 - butanesulfonic acid, 4 - hydroxy - 1 - butanesulfonic acid, and ar - (2 - hydroxyethoxy) - benzenesulfonic acid.

The term "sulfo ester" of an α-methylene carboxylic acid is used herein to mean a carboxylate ester of an α-methylene carboxylic acid and an aliphatic hydroxy sulfonic acid, e.g., an alcohol having a substituent sulfo (—SO₃H) group.

The reaction is carried out by heating a mixture comprising an α-methylene carboxylic acid and an aliphatic hydroxy sulfonic acid at a pressure of from about 20 mm. of mercury to about 200 mm. of mercury in the presence of an effective amount of a polymerization inhibitor. In view of the hygroscopic nature of the aliphatic hydroxy sulfonic acids, they are often used in the form of an aqueous solution conveniently at from about 75 to 90 percent concentration by weight. Water also is formed in the esterification reaction. An excess of the α-methylene carboxylic acid over the quantity required to remove the water present in the system as well as that formed in the esterification reaction is required to obtain all the advantages of the present invention. Thus from about 3 moles to about 10 moles of α-methylene carboxylic acid per mole of aliphatic hydroxy sulfonic acid ordinarily is used. By employing at least 3 moles of α-methylene carboxylic acid per mole of aliphatic hydroxy sulfonic acid, the pot (reactor) temperature is kept low enough to minimize polymerization of the product and furthermore any small quantity of polymer which occasionally might be formed usually is substantially insoluble in a reaction mixture of the above composition and can be removed by filtration. A greater ratio than 10 moles of the α-methylene carboxylic acid per mole of aliphatic hydroxy sulfonic acid gives no significant improvement in results and would require larger reactors because of the increased volume. Usually, a ratio of from about 4 to about 6 moles of the α-methylene carboxylic acid per mole of the sulfonic acid is preferred. To obtain the full advantages of this invention a polymerization inhibitor is required. Conventional materials which are known to inhibit free radical polymerization of vinyl compounds may be used. Representative of useful inhibitors are the quinones such as benzoquinone, anthraquinone, 1,4-naphthoquinone, chloranil, and 9,10-anthraquinone; the phenolic inhibitors such as hydroquinone, p-methoxyphenol, picric acid, pyrocatechol, xylenol, t-butyl catechol, and 4-amino-1-naphthol; and certain other aromatic compounds containing nitrogen and/or sulfur such as phenothiazine, p-phenylenediamine, benzidine, 2,4-diaminoazobenzene, phenyl-α-naphthylamine and trinitrobenzene. Often such inhibitors are used in a quantity from about 0.01 part to about 0.5 part based on 100 parts of product. The presence of some oxygen is most advantageous with phenolic inhibitors so that when such inhibitors are used, ordinarily a stream of air is forced through the compounds to be protected during the period such compounds are at elevated temperatures.

It is well known that the distillation temperature of a specific composition varies directly with the pressure, i.e., as the pressure increases the temperature increases, and vice versa, and that different distillable materials, such as the the α-methylene carboxylic acids used in the practice of this invention, distill at different temperatures at a given pressure depending upon the specific compound. The pressure selected from the range of from about 20 mm. to about 200 m. of mercury for a specific synthesis using a particular α-methylene carboxylic acid will be such that the temperature of the reactants and product does not exceed about 175° C. during the reaction period, i.e., during the period that the azeotropic distillation is occurring. Correspondingly, the temperature will not be lower than the azetropic distillation temperature of the particular α-methylene carboxylic acid at about 20 mm. of mercury. Generally, the temperature used is between about 50° C. and 175° C. The above described procedure provides an approximately quantitative yield of a sulfo aliphatic ester of an α-methylene carboxylic acid in high purity except for the presence of excess α-methylene carboxylic acid. Such excess α-methylene carboxylic acid is removed by distillation at a pressure below about 30 mm. of mercury. During such distillation at lower pressure, i.e., less than 30 mm. of mercury, to remove the excess α-methylene carboxylic acid, substantially the same upper limit of temperature as in the azeotropic distillation, i.e., 175° C., is desirable although higher temperatures can be tolerated particularly when techniques such as flash distillations with short contact times, e.g., less than about one minute, are used. Ordinarily, the lower limit of pressure is such that the α-methylene carboxylic acid vapors can be condensed to a liquid and commonly is above about 0.5 mm. of mercury. Ordinarily, the low-pressure distillation purification step is carried out at a temperature from about 50° C. to about 175° C. A polymerization inhibitor, in addition to any amount remaining from the preceding step, may be added during or prior to the purification step by low-pressure distillation.

The sulfo ester prepared and isolated by the above procedure is in the free-acid form corresponding to the formula

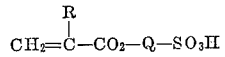

wherein R and Q have the meanings hereinbefore given.

The following examples illustrate the invention but should not be construed as limiting its scope. In the examples, parts and percentages are by weight unless otherwise noted.

*Example 1*

One mole of isethionic acid, as 154 grams of an aqueous solution containing 81.5 percent of the acid, together with 5 moles (430 grams) of glacial methacrylic acid and 1.0 gram of the methyl ether of hydroquinone (as polymerization inhibitor) were charged to a one-liter, three-necked, round bottom flask fitted with a ground glass sealed stirrer, a sparger for leading air through the recator and a fractionating column, 1 ft. x 1 in., packed with 3/16-inch glass helices and equipped with a variable takeoff device and a distillate receiver. About 0.1 gram of phenothiazine (inhibitor) was placed in the distillation receiver. A stream of air at a rate of about 10 milliliters per minute entered through the sparger and thence through the reaction mixture while heating at a head pressure of 50 mm. of mercury caused a water/methacrylic acid azeatrope to distill. The reflux ratio was varied manually throughout the distillation in order to maintain the head temperature at about the boiling point of the azeotrope, 37–39° C. The distillation was discontinued when water stopped distilling as evidenced by an increase in head temperature to 42° C. at a 2/1 reflux/takeoff ratio. The crude product, i.e., the residue in the reactor, was a clear brown fluid weighing 519 grams. Evaporation of volatile materials from the crude product was carried out using a steam-heated, rotating-flask evaporator. Distillation pressure was about 1 mm. and distillation time was about 1 hour. Remaining after such distillation was 205 grams of a brown syrup which upon analysis by saponification and titrations was found to contain 94.5 percent, by weight, of 2-sulfoethyl methacrylate and 4.12 percent of methacrylic acid. The amount of total carboxylate ion after hydrolysis was 5.39 milliequivalents per gram and the amount of unsaturation was 5.34 millimoles per gram. Thus very little polymer was present in the product.

*Example 2*

Another preparation of 2-sulfoethyl methacrylate was carried out by substantially the same method as Example 1 in a 50-gallon, glass-lined reactor (Pfaudler) and accessory equipment suitably increased in size. The azeotropic distillation was carried out at a head pressure of 38 mm. of mercury and an initial head temperature of 32° C. After 5 hours the azeotropic distillation was stopped when the head temperature had risen to 84° C. During the course of the reaction the pot (reactor) temperature gradually increased from 82° C. to 105° C.

The pressure during the subsequent removal or residual methacrylic acid was from about 4 mm. to about 7 mm. of mercury. By this procedure, there was obtained 99 pounds of purified product which contained 96 percent by weight of 2-sulfoethyl methacrylate and 2.7 percent by weight of methacrylic acid according to analysis by titrations and saponification.

The above examples illustrate the practice of the invention using a isethionic acid as the aliphatic hydroxy sulfonic acid and methacrylic acid as the α-methylene carboxylic acid to prepare the sulfo ester of an α-methylene carboxylic acid—specifically 2-sulfoethyl methacrylate. Substantially the same advantageous results are obtained, however, when other hydroxysulfonic acids such as 2-hydroxy-1-propanesulfonic acid, 1-hydroxy-2-butanesulfonic acid, 3-hydroxy-1-propanesulfonic acid and 3-chloro-1-hydroxy-2-butanesulfonic acid are substituted for the isethionic acid of the above examples and when other α-methylene carboxylic acids such as α-hexyl acrylic acid, α-chloroacrylic acid and especially acrylic acid are substituted for the methacrylic acid of the above examples.

The monomeric sulfo esters of α-methylene carboxylic acids are readily polymerized. Homopolymers are prepared by polymerizing individual monomeric sulfo esters, and copolymers are obtained by polymerizing mixtures of two or more of such monomeric sulfo esters. The polymerization can be carried out in mass, i.e., in the absence of diluents, in solution, or in dispersion in non-solvent liquid media. The polymerization is accelerated by heat; by activation with ionizing radiations; and by catalysis with free-radical producing materials such as α,α'-azobis-isobutyronitrile and peroxygen compounds, e.g., sodium or potassium persulfate and cumene hydroperoxide.

The polymeric forms of the products of this invention are used as, and in the preparation of soil conditioners, stabilizers for aqueous colloidal dispersions and emulsions (such as polymer "latexes"), surface-active agents, antistatic finishes for textiles and plastics, adhesives, sizes for textiles and paper, and dye assistants. The monomeric forms of the products of this invention are used in similar ways and are particularly advantageous in being polymerizable during or after preparation of the desired composition or combination of ingredients.

What is claimed is:

1. A method for preparation of sulfo esters which comprises:
    (a) heating a mixture consisting essentially of an aliphatic hydroxy sulfonic acid, an α-methylene carboxylic acid and an effective amount of a polymerization inhibitor at a temperature sufficient to azeotropically distill water and α-methylene carboxylic acid from the mixture at a pressure from about 20 mm. of mercury to about 200 mm. of mercury whereby there is formed a sulfo aliphatic ester of the α-methylene carboxylic acid; said α-methylene carboxylic acid being used in a quantity from about 3 to about 10 times the quantity of said aliphatic hydroxy sulfonic acid, calculated on a mole basis;
    (b) removing residual α-methylene carboxylic acid from the sulfo aliphatic ester by distillation at a pressure less than about 30 mm. of mercury.

2. The method of claim 1 in which the α-methylene carboxylic acid is methacrylic acid.

3. The method of claim 1 in which the aliphatic hydroxy sulfonic acid is isethionic acid.

4. A method for preparation of sulfo esters which comprises:
    (A) forming a reaction mixture consisting essentially of
        (1) an aliphatic hydroxy sulfonic acid having the formula $$HO-Q-SO_3H$$

wherein Q is a bivalent organic radical in which the —OH radical is attached to an aliphatic carbon atom
        (2) an alpha-methylene carboxylic acid having the formula $$\underset{\underset{\text{R}}{|}}{CH_2=C-CO_2H}$$

wherein R is a radical selected from the group consisting of hydrogen, the halogens and alkyl radicals and
        (3) an effective amount of a polymerization inhibitor;
    said carboxylic acid being present in the reaction mixture in a quantity of from about 3 moles to about 10 moles for each mole of said sulfonic acid;
    (B) heating the reaction mixture at a temperature sufficient to azeotropically distill water and alpha-methylene carboxylic acid from the reaction mixture at a pressure from about 20 millimeters of mercury to about 200 millimeters of mercury whereby there is formed a sulfo aliphatic ester of the alpha-methylene carboxylic acid and
    (C) removing residual alpha-methylene carboxylic acid from the sulfo aliphatic ester by distillation at a pressure less than about 30 millimeters of mercury.

5. The method of claim 4 in which the alpha-methylene carboxylic acid is methacrylic acid and the aliphatic hydroxy sulfonic acid is isethionic acid.

References Cited

UNITED STATES PATENTS

| | | | |
|---|---|---|---|
| 2,922,815 | 1/1960 | Faerber | 260—526 |
| 2,923,734 | 2/1960 | Sheetz | 260—486 |

LORRAINE A. WEINBERGER, *Primary Examiner.*

LEON ZITVER, *Examiner.*

D. P. CLARKE, A. P. HALLIUN, *Assistant Examiners.*